No. 656,026. Patented Aug. 14, 1900.
J. KRONENBERG.
HORSESHOE PAD.
(Application filed Apr. 5, 1900.)

(No Model.)

WITNESSES:
Edward Thorpe

INVENTOR
Jacob Kronenberg
BY
ATTORNEYS

THE NORRIS PETERS CO., PHOTO-LITHO., WASHINGTON, D. C.

UNITED STATES PATENT OFFICE.

JACOB KRONENBERG, OF NEW YORK, N. Y.

HORSESHOE-PAD.

SPECIFICATION forming part of Letters Patent No. 656,026, dated August 14, 1900.

Application filed April 5, 1900. Serial No. 11,664. (No model.)

*To all whom it may concern:*

Be it known that I, JACOB KRONENBERG, a citizen of the United States, and a resident of the city of New York, borough of Brooklyn, in the county of Kings and State of New York, have invented a new and Improved Horseshoe-Pad, of which the following is a full, clear, and exact description.

The object of the invention is to provide a new and improved horseshoe-pad arranged to ease a horse in walking, to give a secure foothold, especially when going up a hill, and to prevent the animal from slipping sidewise or forward when going down a hill.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1:
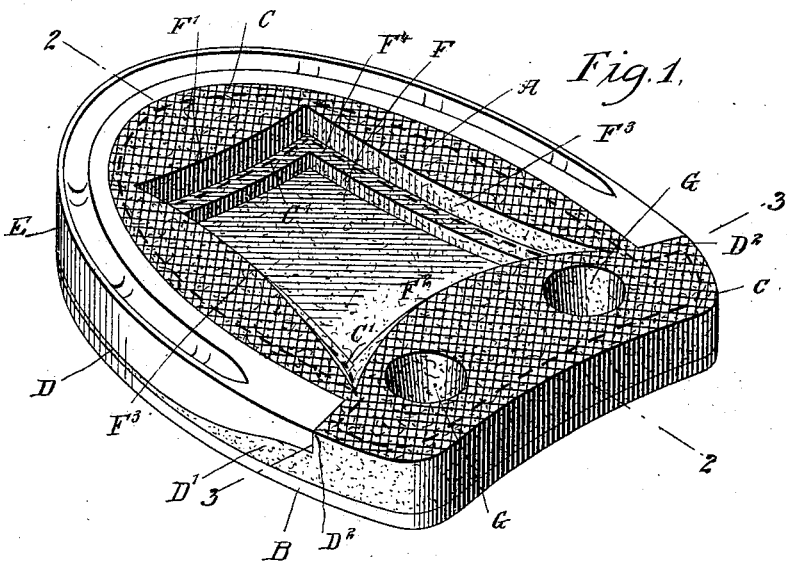
Figure 2:
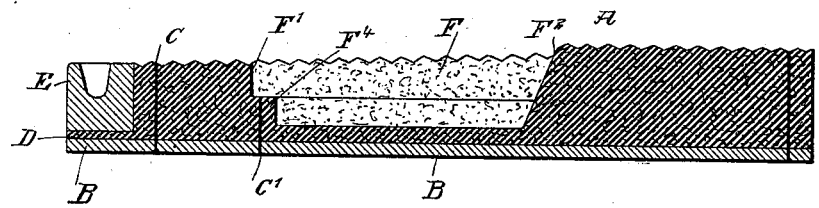
Figure 3:
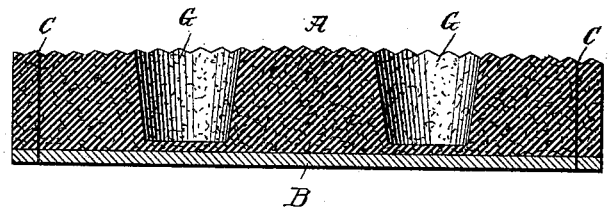

Figure 1 is a perspective view of the improvement in an inverted position and with the horseshoe in position. Fig. 2 is a longitudinal sectional elevation of the same on the line 2 2 in Fig. 1, and Fig. 3 is a transverse section of the same on the line 3 3 in Fig. 1.

The improved horseshoe-pad consists, essentially, of a body A and a back plate B, of leather, said body and back plate being secured together, preferably, by two rows of stitches C C', as is plainly indicated in the drawings. The body A is made of a composition of rubber and cork, so as to insure proper elasticity of the pad and at the same time insure a better foothold for the animal, owing to the cork contained in the mixture.

The body A is formed on its sides and forward end with a flange D in the shape of the horseshoe E, fitted upon said flange and the side of the body, as is plainly indicated in Fig. 1, the portions D' of said flange D being somewhat thickened and terminating in shoulders $D^2$, against which abut the ends of the horseshoe. The shoulders $D^2$ are integral parts of the rear or frog portion of the horseshoe-pad, as will be readily understood by reference to Fig. 1.

In the under side of the body A is formed a recess F, having a front wall F', a rear wall $F^2$, and side walls $F^3$, which are curved inward so as to form curved edges and give a better foothold to the animal, as hereinafter more fully explained. The forward wall F' and the side walls $F^3$ are formed with inwardly-extending flanges $F^4$ for receiving the second row of stitches C', which row of stitches runs into the outermost row of stitches C, adjacent to the shoulders $D^2$, as indicated in Fig. 1.

By having the walls of the recess F curved in the manner described it is evident that the side walls $F^3$ prevent the animal from slipping sidewise, while the forward wall F' forms a secure gripping edge when the animal is ascending a hill and takes the place of the toe on the ordinary shoe, and the rear wall $F^2$ produces a firm gripping edge for preventing the animal from slipping forward when descending a hill.

In the rear or frog portion of the body A are formed suction-cups G, and as this portion is somewhat higher than the remaining part of the body it is evident that when the animal plants his foot down this portion is first compressed, so that the suction-cups G come immediately into action to insure a secure hold of the pad on the road-bed on which the animal is traveling at the time, the cups taking the place of the ordinary heels of the shoe now used.

It is understood that the body A is molded in a suitable mold to give the desired shape to said body, it being understood that the under surface of the pad is preferably roughened, as indicated in the drawings, to increase the holding capacity of the shoe on the road-bed.

Having thus fully described my invention, I claim as new and desire to secure by Letters Patent—

1. A horseshoe-pad having a raised rear or heel portion and provided in the lower face of the said raised portion with suction-cups, as and for the purpose set forth.

2. A horseshoe-pad having a body formed with a recess in its under side, the opposing walls of the recess being curved inward toward each other to form gripping edges, substantially as shown and described.

3. A horseshoe-pad having a raised rear or frog portion and provided with suction-cups in the said raised portion, a recess, and a marginal flange to receive the shoe, said flange terminating in shoulders against which the ends of the shoe abut, substantially as described.

4. A horseshoe-pad, comprising a body of elastic material, and a back plate secured to the body, the said body having a raised rear or frog portion and provided with suction-cups in the said raised portion, a recess having inwardly-curved walls, and a marginal flange to receive a shoe, said flange terminating at the raised frog or rear portion in shoulders against which the ends of the shoe abut, substantially as described.

In testimony whereof I have signed my name to this specification in the presence of two subscribing witnesses.

JACOB KRONENBERG.

Witnesses:
    THEO. G. HOSTER,
    EVERARD BOLTON MARSHALL.